(No Model.)
G. S. ADAMS.
COMBINATION CARTRIDGE LOADING AND UNLOADING TOOL.
No. 428,328. Patented May 20, 1890.
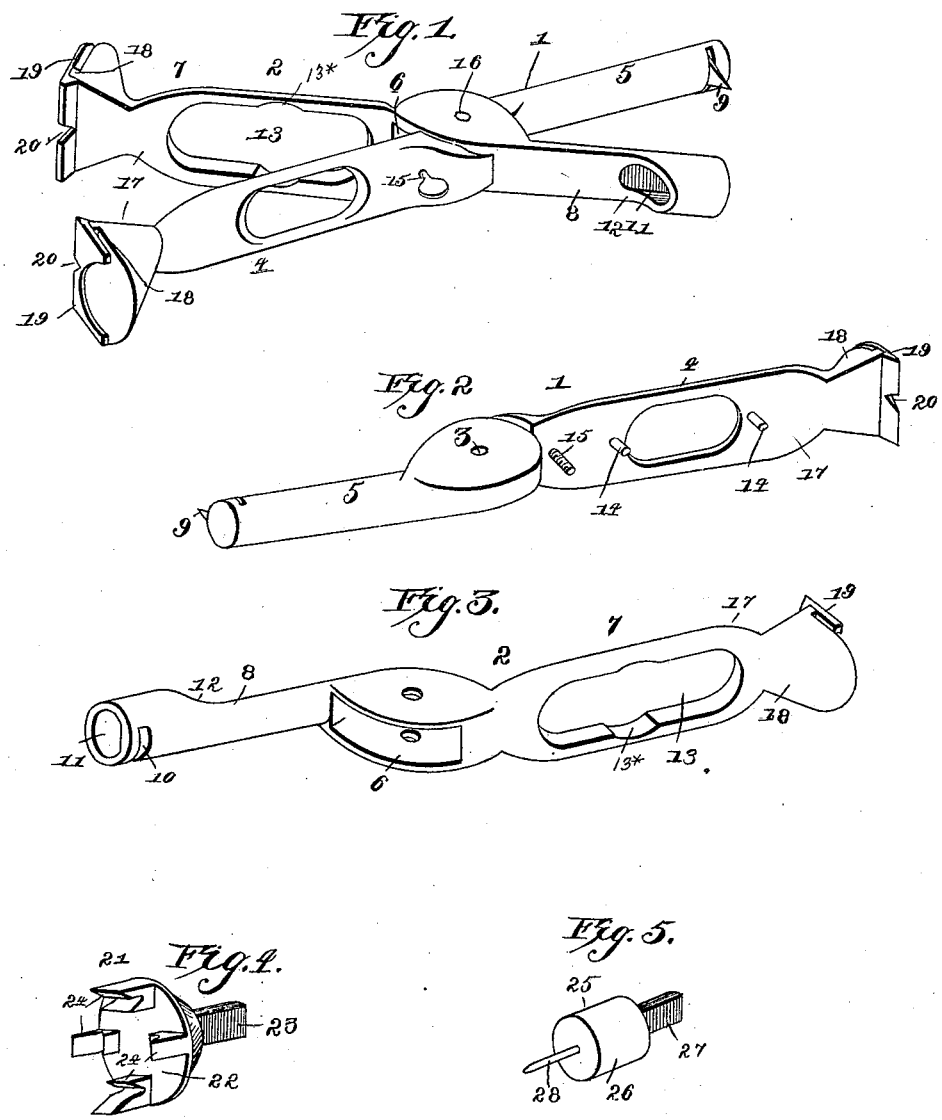
Witnesses:
Henry G. Dieterich
W. S. Duvall
Inventor:
Gideon S. Adams
By his Attorneys

UNITED STATES PATENT OFFICE.

GIDEON S. ADAMS, OF CAMDEN, NEW JERSEY.

COMBINATION CARTRIDGE LOADING AND UNLOADING TOOL.

SPECIFICATION forming part of Letters Patent No. 428,328, dated May 20, 1890.

Application filed May 11, 1889. Serial No. 310,369. (No model.)

*To all whom it may concern:*

Be it known that I, GIDEON S. ADAMS, a citizen of the United States, residing at Camden, in the county of Camden and State of New Jersey, have invented a new and useful Combination Cartridge Loading and Unloading Tool, of which the following is a specification.

This invention has relation to a combination cartridge loading and unloading tool; and among the objects in view are to combine in a single tool all the necessary devices for preparing a cartridge for loading and for unloading the same.

A further object in view is to so construct the tool as to be a model of simplicity and cheapness and also durability.

With these general objects in view the invention consists in certain features of construction hereinafter specified, and more particularly pointed out in the claims.

Referring to the drawings, Figure 1 is a perspective of a cartridge implement or combination-tool constructed in accordance with my invention. Figs. 2 and 3 are details in perspective of the two jaws and their operating-levers. Fig. 4 is a detail in perspective of an attachment for crimping the cartridge-shell employed in loading. Fig. 5 is a detail of a cap-punch and cleaner.

Like numerals of reference indicate like parts in all the figures of the drawings.

The device consists, essentially, of two jaws 1 and 2. The jaw 1 is reduced near its center portion, and provided with a perforation 3, and consists of a rearwardly-extending handle 4, and a forwardly-projecting portion 5, preferably of cylindrical form and of a diameter agreeing with the thickness of the reduced flattened portion in which is formed the perforation 3. The jaw 2 comprises the central recessed portion 6, a rearwardly-extended portion or handle 7, and a forwardly-projecting portion 8. Into the recess 6 of this latter jaw is inserted the cylindrical portion 8 and the reduced portion of the jaw 1, and through the same is passed a pivot 16. The two forward portions 8 and 5 are cylindrical in cross-section, and the last-mentioned portion 5 is provided with an inwardly-disposed knife or cutter 9. A recess 10 is formed in the opposite jaw 8, and registers with the knife 9 of the jaw 5. The jaw 8 is preferably formed larger than the jaw 5, and is of about a size to receive an ordinary-sized paper shell, and is further provided with a bore 11, the bottom of which is open; or, in other words, said jaw is reduced or cut away at its lower end, as at 12. The jaw 2 in rear of its pivot is extended to form the before-mentioned handle 7, and intermediate its pivot and rear end is provided with opposite shell-receiving elongated slots, forming opposite openings 13 of different diameters, connected by a larger opening 13×, through which the flanged end of the shell is first introduced. The jaw 1 is provided with outwardly-projecting lugs 14, registering with the center of each of the two openings 13, for the purpose hereinafter specified. Through the shank of the jaw 1, and slightly in rear of its pivot 16, is inserted a set-screw 15, the upper end of which bears against the under surface of the handle or lever 7. The extremities of the handles 4 and 7 are flared to form a base 17, having a flat surface at their ends and having opposite adjacent shoulders 18.

19 represents U-shaped plates, which are secured to or formed upon the shoulders 18 and extend partially over their surfaces and, by the reason of the shoulder 18, forming a recess or space between the plates and the bases 17. Each of the two opposite bases and plates 19 are oppositely notched, as at 20.

21 represents a crimper. The same consists of a disk or plate portion 22, having a shank 23 projecting from its rear face and corresponding in shape to the bore 11 in the jaw 5. The front surface of the disk near its edges are provided with forwardly-projecting notched lugs 24.

25 represents an uncapper and nipple-reamer, having a disk 26, a shank 27, and a reaming-pin 28, projecting from the forward portion, the shank of said reamer or cleaner being designed also to fit the bore 11.

The operation of reloading a shell is as follows: The first thing desirable is to trim the edge of the shell that has become frayed from the explosion, in order that a neat crimp may be made. For this purpose the open end of the shell is introduced over the end of the jaw 8 and the ragged portion projected beyond the plane or line of the knife 9. Now by closing the jaws as in the manner of an ordinary pair of shears, and holding the shell with one hand and revolving the device with the other, the knife or cutter moves around the shell and removes a portion thereof, leaving a clean edge. The next thing necessary is to remove the old cap. This is done by the cleaner or reamer 26, which is inserted in the bore 11 of the jaw 5 and is employed to remove the cap and thoroughly clean or ream all dirt from the nipple. The shell is now loaded in the usual manner, and the jaw 5 may be used as a rammer. After the charge of powder and wad and shot and wad has been placed in the shell the reamer 21 is inserted in the bore 11 of the jaw 5 and the edge of the shell introduced in the notched lugs 24 thereof. Now by revolving either the shell or the tool and forcing the same against the shell the edges of the shell are turned and crimped in the usual manner, whereby charges are held in position. It now simply remains to cap the shell, when the same is ready for use. This is accomplished by inserting the shell in the opening $13^\times$, and then to the right or left into one of the recesses 13. The cap is then inserted and the jaws closed, the lugs 14 acting to force the caps in place.

It will be noticed that each of the plates 19 is provided with different-sized recesses, whereby they are adapted for shell-heads of different sizes. These plates are for the purpose of withdrawing shells from the breech of a gun when the extractor fails to work properly or the shell has become expanded within the breech.

If desired, the two jaws may be simply and easily cast and provided with the attachments shown, and in this manner an extremely cheap as well as useful hand-tool is provided.

Having described my invention, what I claim is—

1. A combination cartridge-loading implement comprising two jaws pivoted to each other and extended to the rear of their pivot to form handles, one of which is recessed to receive a shell, and the other of which is provided with a lug or pin concentric with the recess and adapted for capping said shell, substantially as specified.

2. A combination cartridge-loading implement comprising two jaws pivoted to each other and extended to the rear of its pivot to form handles, one of which is provided with an elongated recess, the ends of which vary in width to receive shells of varying sizes, and the other of which is provided with a series of capping-pins concentric with the recesses, substantially as specified.

3. A combination cartridge-loading implement comprising two jaws pivoted to each other and extended to the rear of its pivot to form handles, one of which is provided with an elongated recess, the ends of which vary in diameter for the reception of shells of different sizes, and a larger intermediate shell-introducing recess, and the other of which is provided with opposite pins, one of which registers with the center of shells when in position in the ends of the enlongated recess, substantially as specified.

4. A combination cartridge-loading implement consisting of opposite jaws pivoted to each other and extended to the rear to form handles, said handles terminating in shell-extractors, substantially as specified.

5. A combination loading implement comprising two jaws pivoted to each other and extended to the rear, and terminating in U-shaped cartridge-extractors of different sizes, substantially as specified.

6. A combination loading implement comprising two jaws pivoted together and extended to the rear to form handles, terminating in flared bases and shouldered at their adjacent edges and provided with U-shaped shell-embracing plates, substantially as specified.

7. A combination loading implement consisting of two jaws pivoted together, one of which is provided with a hollow body portion approximating the bore of a shell, and having an annular slot, and the other of which is provided with an inwardly-disposed cutter registering in the slot, substantially as specified.

8. A cartridge-loading implement having two jaws pivoted together, one of which carries a cutter, the opposite one of which is enlarged to receive a shell, and cut away at one side and provided with the cylindrical bore, and with a notch registering with said cutter, substantially as specified.

9. A cartridge-loading implement one of the jaws of which is provided with a bore, in combination with a crimper provided with a shank adapted to be inserted in and held by the bore, and provided with a disk portion having radially-arranged peripheral-notched crimping-lugs, substantially as specified.

10. The crimping attachment consisting of a disk portion having radially-arranged peripheral-notched crimping-lugs, substantially as set forth.

11. A combination cartridge-loading implement consisting of two jaws pivoted together and provided with shell-extractors at one end, the cutter on one of the jaws at the other end, and the other end of the other jaw approximating the bore of a shell, as set forth.

In testimony that I claim the foregoing as my own I have hereto affixed my signature in presence of two witnesses.

GIDEON S. ADAMS.

Witnesses:
 PHILIP SCHMITZ,
 PHILIP C. BOTT.